United States Patent
Keen et al.

(10) Patent No.: US 10,785,270 B2
(45) Date of Patent: Sep. 22, 2020

(54) IDENTIFYING OR CREATING SOCIAL NETWORK GROUPS OF INTEREST TO ATTENDEES BASED ON COGNITIVE ANALYSIS OF VOICE COMMUNICATIONS

(71) Applicant: International Business Machines Corporation, Armonk, NY (US)

(72) Inventors: Martin G. Keen, Cary, NC (US); Grant Mericle, Durham, NC (US); Martin Presler-Marshall, Chapel Hill, NC (US); Ravi Ranjan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 15/786,859

(22) Filed: Oct. 18, 2017

(65) Prior Publication Data

US 2019/0116210 A1    Apr. 18, 2019

(51) Int. Cl.
*G06F 15/16* (2006.01)
*H04L 29/06* (2006.01)
*H04L 12/18* (2006.01)
*H04M 3/56* (2006.01)
*G06Q 50/00* (2012.01)
(Continued)

(52) U.S. Cl.
CPC .......... *H04L 65/403* (2013.01); *G06F 40/279* (2020.01); *G06Q 50/01* (2013.01); *G10L 15/1815* (2013.01); *G10L 15/1822* (2013.01); *H04L 12/1822* (2013.01); *H04L 65/1069* (2013.01); *H04L 67/306* (2013.01); *H04M 3/563* (2013.01); *G10L 15/26* (2013.01); *H04M 2201/40* (2013.01); *H04M 2201/41* (2013.01);
(Continued)

(58) Field of Classification Search
CPC .. H04L 12/1822; H04L 65/403; H04L 67/306
USPC ........................................................ 709/204
See application file for complete search history.

(56) References Cited

U.S. PATENT DOCUMENTS 7,047,192 B2   5/2006  Poirier
8,346,864 B1   1/2013  Amidon et al.
(Continued)

FOREIGN PATENT DOCUMENTS

WO   2014059347 A1   4/2014
WO   2016022588 A1   2/2016

*Primary Examiner* — Wing F Chan
*Assistant Examiner* — Andrew Woo
(74) *Attorney, Agent, or Firm* — Robert A. Voigt, Jr.; Winstead PC

(57) ABSTRACT

A method, system and computer program product for discovering social network groups of interests to attendees of a group gathering. Voice imprints of attendees of a group gathering are received during a registration process. The received voice imprints are associated with the registered attendees. A voice stream that was captured in the group gathering is then translated to a list of utterances. Each utterance is then tagged with the attendee who made the utterance based on the voice imprints provided by the attendees during registration. The utterances are parsed and analyzed to identify concepts and keywords. An attendee to the group gathering may then be associated with a social network group (either preexisting or newly created) with a mapping to concepts and keywords that have a similarity to the identified concepts and keywords that meets or exceeds a threshold.

20 Claims, 4 Drawing Sheets

(51) Int. Cl.
*G10L 15/18* (2013.01)
*H04L 29/08* (2006.01)
*G06F 40/279* (2020.01)
*G10L 15/26* (2006.01)

(52) U.S. Cl.
CPC ............... *H04M 2203/556* (2013.01); *H04M 2203/655* (2013.01)

(56) References Cited

U.S. PATENT DOCUMENTS

| | | |
|---|---|---|
| 9,020,472 B2 | 4/2015 | Scriven et al. |
| 9,070,369 B2 | 6/2015 | Cox et al. |
| 9,336,776 B2 | 5/2016 | Dahlmeier et al. |
| 2011/0305326 A1 | 12/2011 | Poirier et al. |
| 2012/0076367 A1 | 3/2012 | Tseng |
| 2016/0086605 A1 | 3/2016 | Kim et al. |
| 2017/0147576 A1* | 5/2017 | Des Jardins .......... G10L 15/063 |
| 2019/0182176 A1* | 6/2019 | Niewczas ............... G10L 15/30 |

* cited by examiner

IDENTIFYING OR CREATING SOCIAL NETWORK GROUPS OF INTEREST TO ATTENDEES BASED ON COGNITIVE ANALYSIS OF VOICE COMMUNICATIONS

TECHNICAL FIELD

The present invention relates generally to group gatherings, such as conferences, meetings and social gatherings, and more particularly to identifying or creating social network groups of interest to attendees of group gatherings (e.g., conference) based on cognitive analysis of voice communications that transpire at the group gathering.

BACKGROUND

It is a human tendency to express ideas and opinions, especially in collaborating with others who share an interest to such ideas and opinions. However, in certain settings, such as a group gathering (e.g., conference, meeting, social gathering), it becomes more difficult to collaborate with other persons who may be discussing topics of interest.

For example, suppose that an attendee to a conference has an interest in cloud technologies and asks a specific question regarding the use of a load balancer. There may be other attendees who have a similar question or share a similar interest, but due to the size of the group gathering, are not able to reach out to the attendee who asked the question. Furthermore, the attendee who asked the question may also have an interest in collaborating with others who share the same interest.

Unfortunately, current systems, such as conference systems, do not have the ability to identify or create social network groups to join attendees of a group gathering who may share a common interest and be interested in collaborating amongst each other.

SUMMARY

In one embodiment of the present invention, a method for discovering social network groups of interests to attendees of a group gathering comprises receiving voice imprints from attendees of the group gathering. The method further comprises associating the received voice imprints with the attendees of the group gathering. The method additionally comprises translating a voice stream captured in the group gathering to a list of utterances. Furthermore, the method comprises tagging each utterance in the list of utterances with an attendee of the group gathering using the voice imprints of the attendees of the group gathering. Additionally, the method comprises parsing and analyzing utterances in the list of utterances to identify concepts and keywords. In addition, the method comprises associating one or more of the identified concepts and keywords to a first attendee that is tagged to corresponding utterances. Furthermore, the method comprises associating, by a processor, the first attendee to a social network group in response to the social network group having concepts and keywords with a similarity to the one or more identified concepts and keywords that meets or exceeds a threshold.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
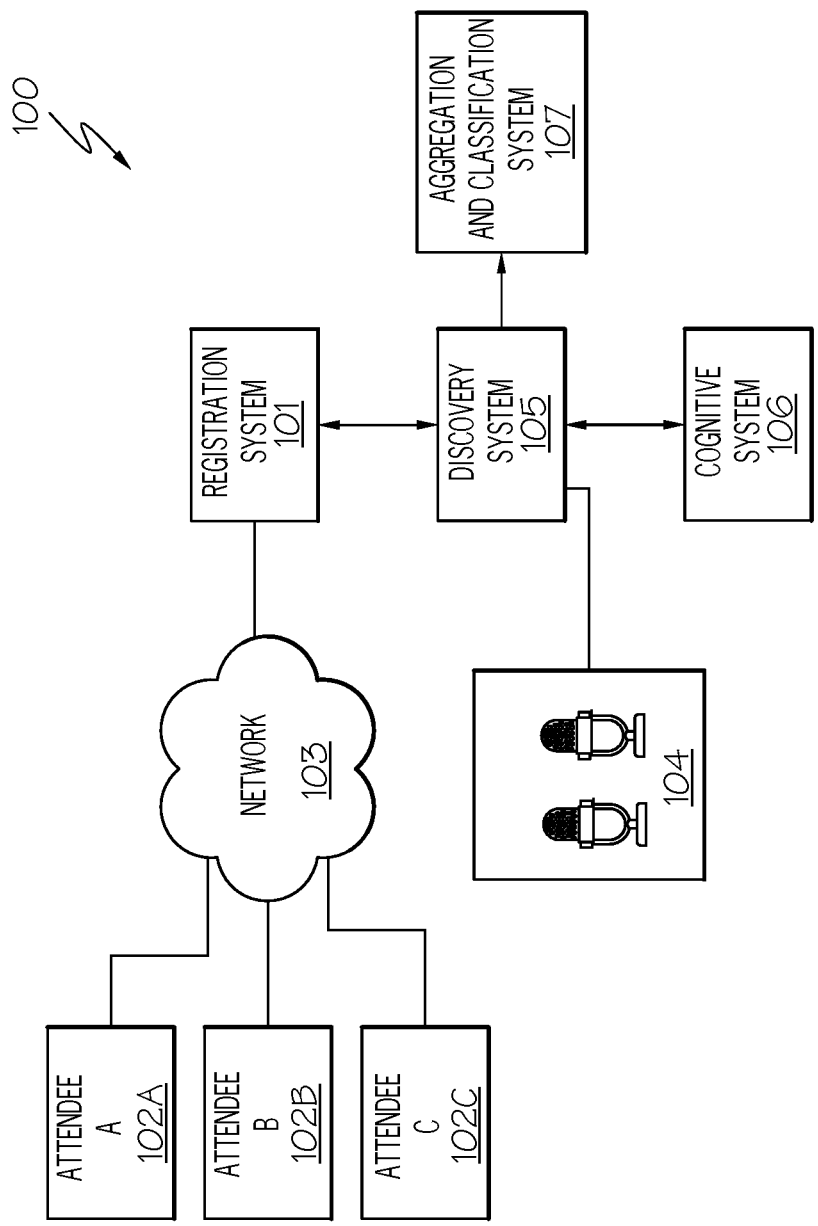
FIG. 1 illustrates a conference system configured in accordance with an embodiment of the present invention.

The present invention comprises a method, system and computer program product for discovering social network groups of interests to attendees of a group gathering (e.g., conference). In one embodiment of the present invention, voice imprints of attendees of a group gathering are received by a system, referred to herein as the registration system, such as during a registration process. The registration system associates the received voice imprints with the registered attendees. Another system, referred to herein as the discovery system, translates a voice stream that was captured in the group gathering to a list of utterances. The discovery system then tags each utterance with the attendee who made the utterance based on the voice imprints provided by the attendees during registration. A further system, referred to herein as the cognitive system, uses natural language processing to parse and analyze the utterances to identify concepts and keywords. Keywords, as used herein, refer to a word or words that are used to describe the attendee's interests, opinions, ideas, etc. Concepts, as used herein, refer to the general notion of the attendee's interests, opinions, ideas, etc. Furthermore, a system, referred to herein as the aggregation and classification system, retrieves a pre-defined mapping of social network groups and associated concepts and keywords. The aggregation and classification system may then associate an attendee of the group gathering to one of these social network groups if the social network group has a mapping to concepts and keywords that have a similarity to the identified concepts and keywords that meets or exceeds a threshold. Invitations may then be sent out to the appropriate attendee(s) to join the preexisting social network group. Since the utterances of the identified concepts and keywords are tagged with the attendee who made those utterances, the aggregation and classification system is able to associate that attendee with the social network group that has similar concepts and keywords. If, however, there are no preexisting social network groups with a mapping to concepts and keywords that have a similarity to the identified concepts and keywords that meets or exceeds a threshold, then the aggregation and classification system may create a new social network group to be associated with these new concepts/keywords. Invitations may then be sent out to the appropriate attendees to join the newly created social network group. In this manner, the present invention provides a technological solution to the technical problem where systems, such as conference systems, are now able to discover social network groups of interests to attendees of the group gathering (e.g., conference) based on voice conversations.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with discovering social network groups of interest to attendees of a conference, the principles of the present invention may be applied to other types of group gatherings, such as meetings and social gatherings. A person of ordinary skill in the art would be capable of applying the principles of the present invention to such implementations. Further, embodiments applying the principles of the present invention to such implementations would fall within the scope of the present invention.

Referring now to the Figures in detail, FIG. 1 illustrates a conference system 100 configured in accordance with an embodiment of the present invention. Referring to FIG. 1, conference system 100 includes a registration system 101 configured to register attendees 102A-102C (identified as "Attendee A," "Attendee B," and "Attendee C," respectively) (both attendees and the attendees' computing devices are identified with element 102) of the conference, such as via online. For example, attendees 102A-102C may register for the conference using their computing devices (e.g., smartphone, desktop computer) connected to registration system 101 via a network 103. Attendees 102A-102C may collectively or individually be referred to as attendees 102 or attendee 102, respectively. Attendees 102, as used herein, refer to any person (or computing device utilized by such a person) who is participating in the conference, such as, but not limited to, the speaker, presenter, participant, etc.

In one embodiment, the registration process involves attendees 102 providing identification, such as a name and e-mail address. In one embodiment, registration system 101 receives a voice imprint from attendee 102, where the voice imprint is then associated with the registered attendee. In one embodiment, such a voice imprint is received by registration system 101 via a user's verbal introduction in response to a preset list of questions provided by registration system 101. Furthermore, in one embodiment, registration system 101 may create a profile for each attendee 102 containing keywords and concepts associated with attendee 102 based on answers provided by attendee 102 to a preset list of questions provided by registration system 101, such as via network 103. Keywords, as used herein, refer to a word or words that are used to describe the attendee's interests, opinions, ideas, etc. Concepts, as used herein, refer to the general notion of the attendee's interests, opinions, ideas, etc. In one embodiment, such keywords and concepts are derived from the answers provided by attendee 102 using natural language processing, which is used to provide meaning to the answers provided by attendee 102. Furthermore, in one embodiment, the attendee's interests, opinions, ideas, etc. that can be derived from the answers provided by attendee 102 using natural language processing may be stored in the attendee's profile.

Attendees' computing devices 102 may be a portable computing unit, a Personal Digital Assistant (PDA), a smartphone, a laptop computer, a mobile phone, a navigation device, a game console, a desktop computer system, a workstation, an Internet appliance and the like.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Conference system 100 further includes listening devices 104 (e.g., array of microphones) configured to capture a voice stream in the conference. Listening devices 104 may be placed in a conference room, such as a handheld microphone or a microphone placed on a speaker's pedestal. Examples of such listening devices 104 include Microflex® Advance®'s ceiling and table array microphones or ClearOne®'s ceiling microphone array. In an alternative embodiment, such listening devices 104 may be embodied in attendee's computing systems 102 that may be utilized in a group gathering, such as in a web conference.

Conference system 100 additionally includes a discovery system 105 connected to registration system 101. Furthermore, discovery system 105 is connected directly to listening devices 104, or alternatively, indirectly, such as via network 103 and registration system 101. In one embodiment, discovery system 105 receives the captured voice stream from listening devices 104. In one embodiment, discovery system 105 translates the captured voice stream to a list of utterances (also referred to herein as the "transcript"), such as by using speech recognition software. In one embodiment, such a translation process occurs at a predefined interval.

Furthermore, in one embodiment, discovery system 105 generates a score, referred to herein as the "clarity" score, for each utterance. A "clarity score," as used herein, refers to a value that indicates the level of clarity in the utterance. For example, the higher the value of the clarity score, the greater the clarity in the utterance. In one embodiment, the clarity score depends on factors, such as the relative recorded volume level of the utterance and whether multiples utterances are recorded concurrently in the captured voice stream (e.g., multiple conversations are being captured concurrently). In one embodiment, utterances that are associated with a clarity score below a threshold (a particular value, which may user selected) are discarded.

In one embodiment, discovery system 105 tags each utterance with the attendee 102 who made the utterance based on the voice imprints provided by attendees 102 during registration. In one embodiment, discovery system 105 utilizes speaker recognition software, such as Microsoft® speaker recognition APIs (application programming interfaces). Furthermore, in one embodiment, discovery system 105 further tags each utterance with the corresponding clarity score.

Furthermore, conference system 100 includes cognitive system 106 connected to discovery system 105. In one embodiment, the transcript is submitted to cognitive system 106 by discovery system 105. In one embodiment, cognitive system 106 uses natural language processing to parse and analyze the utterances in the transcript to identify concepts and keywords. Furthermore, in one embodiment, cognitive system 106 may generate a score, referred to herein as the "relative score," used to assess the ability of the identified concepts and keywords to describe the attendee's interest, opinion, idea, etc. For example, the higher the score, the greater the ability that the corresponding concept or keyword is able to describe the attendee's interest, opinion, idea, etc. In one embodiment, such a score is assessed based on how closely linked the concept or keyword is to the attendee's interest, opinion, idea, etc. For example, the keyword of "Detroit Tigers" may be used to describe the attendee's interest in the Detroit Tigers baseball team. Such a keyword would have a higher relative score than the keyword of "baseball" since the term "Detroit Tigers" is more closely linked to the attendee's interest in following the Detroit Tigers baseball team.

In one embodiment, cognitive system 106 utilizes IBM Watson® Discovery Service to identify the concepts mentioned in the utterances. In such a tool, cognitive system 106 is able to infer that two different speakers are discussing the same concept (e.g., load balancer) even though different terms are being used (e.g., Ribbon Load Balancing client and F5 Local Traffic Manager).

Additionally, conference system 100 includes an aggregation and classification system 107 connected to discovery system 105. In one embodiment, aggregation and classification system 107 classifies concepts and keywords identified by cognitive system 106 with a corresponding relative score that is not below a threshold (a particular value, which may user selected).

In one embodiment, such concepts and keywords (those identified by cognitive system 106 with a corresponding relative score that are not below a threshold) are analyzed. Furthermore, in one embodiment, the analyzed concepts and keywords include the concepts and keywords that are stored in the attendees' profiles. After such concepts and keywords are analyzed, those concepts and keywords which are not relevant to the topic of the overall conversation or are part of a private conversation are excluded. In one embodiment, aggregation and classification system 107 analyzes the transcript to determine the topic of the overall conversation or whether a private conversation was recorded. In one embodiment, aggregation and classification system 107 utilizes natural language processing in analyzing the transcript described above. For example, aggregation and classification system 107 may identify the term "bat" in connection with the term "baseball." Since baseball was used in connection with the term "bat," the term "bat" is interpreted as a wooden instrument for hitting a baseball as opposed to a flying mammal. In another example, certain keywords or conversational tone may indicate that the conversation is to be private.

In one embodiment, aggregation and classification system 107 retrieves a pre-defined mapping of social network groups and associated concepts and keywords. Aggregation and classification system 107 may then determine if there is a match between the analyzed concepts and keywords and the concepts and keywords associated with these social network groups. In one embodiment, such a determination is made based on the similarity between the analyzed concepts and keywords and the concepts and keywords associated with these social network groups.

If the similarity between the analyzed concepts and keywords and the concepts and keywords associated with these social network groups meets or exceeds a threshold (a particular value, which may user selected), then aggregation and classification system 107 associates those attendee(s) of the analyzed concepts and keywords to the relevant social network group(s). In one embodiment, aggregation and classification system 107 may further tag the profile of these attendee(s) to the relevant social network group(s).

If, however, there is not a match between one of these social network groups, then aggregation and classification system 107 may provide an option (such as to attendee 102) to start a new social network group with an affinity for these analyzed concepts and keywords. If aggregation and classification system 107 receives permission to start such a new social network group, aggregation and classification system 107 then creates such a new social network group.

In one embodiment, users, such as attendees 102, may have the ability to search the various social ad-hoc network groups, associated attendees and their profiles, such as via an interface to discovery system 105.

System 100 is not to be limited in scope to any one particular architecture. System 100 may include any number of attendees 102, registration systems 101, networks 103, listening devices 104, discovery systems 105, cognitive systems 106 and aggregation and classification systems 107.

A description of the hardware configuration of such systems, such as registration system 101, discovery system 105, cognitive system 106 and aggregation and classification system 107, is provided below in connection with FIG. 2.

Figure 2:
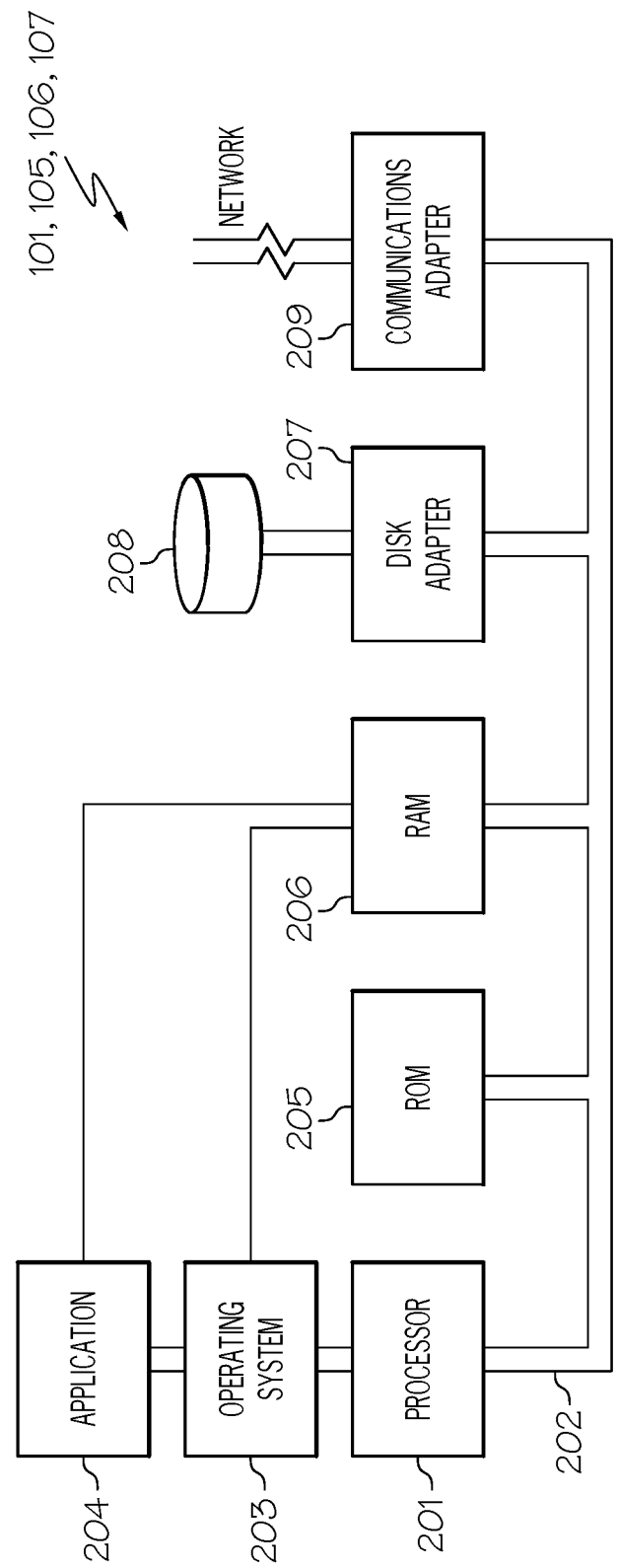
FIG. 2 illustrates a hardware configuration of the registration system, the discovery system, the cognitive system and the aggregation and classification system configured in accordance with an embodiment of the present invention.

Referring now to FIG. 2, FIG. 2 illustrates a hardware configuration of registration system 101, discovery system 105, cognitive system 106 and aggregation and classification system 107 (FIG. 1), which is representative of a hardware environment for practicing the present invention. Referring to FIG. 2, registration system 101, discovery system 105, cognitive system 106 and aggregation and classification system 107 have a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for discovering social network groups of interest to attendees of a group gathering as discussed further below in association with FIGS. 3A-3B.

Referring again to FIG. 2, read-only memory ("ROM") 205 is coupled to system bus 202 and includes a basic input/output system ("BIOS") that controls certain basic functions of registration system 101, discovery system 105, cognitive system 106 and aggregation and classification system 107. Random access memory ("RAM") 206 and disk adapter 207 are also coupled to system bus 202. It should be noted that software components including operating system 203 and application 204 may be loaded into RAM 206, which may be registration system's 101, discovery system's 105, cognitive system's 106 and aggregation and classification system's 107 main memory for execution. Disk adapter 207 may be an integrated drive electronics ("IDE") adapter that communicates with a disk unit 208, e.g., disk drive. It is noted that the program for discovering social network groups of interest to attendees of a group gathering, as discussed further below in association with FIGS. 3A-3B, may reside in disk unit 208 or in application 204.

Registration system 101, discovery system 105, cognitive system 106 and aggregation and classification system 107 may further include a communications adapter 209 coupled to bus 202. Communications adapter 209 interconnects bus 202 with an outside network (e.g., network 103 of FIG. 1) thereby allowing registrations system 101, discovery system

105, cognitive system 106 and aggregation and classification system 107 to communicate with attendees 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, it is a human tendency to express ideas and opinions, especially in collaborating with others who share an interest to such ideas and opinions. However, in certain settings, such as a group gathering (e.g., conference, meeting, social gathering), it becomes more difficult to collaborate with other persons who may be discussing topics of interest. For example, suppose that an attendee to a conference has an interest in cloud technologies and asks a specific question regarding the use of a load balancer. There may be other attendees who have a similar question or share a similar interest, but due to the size of the group gathering, are not able to reach out to the attendee who asked the question. Furthermore, the attendee who asked the question may also have an interest in collaborating with others who share the same interest. Unfortunately, current systems, such as conference systems, do not have the ability to identify or create social network groups to join attendees of a group gathering who may share a common interest and be interested in collaborating amongst each other.

The principles of the present invention provide a means for discovering social network groups of interests to attendees of a group gathering (e.g., conference) based on voice conversations as discussed below in connection with FIGS. 3A-3B.

Figure 3A:
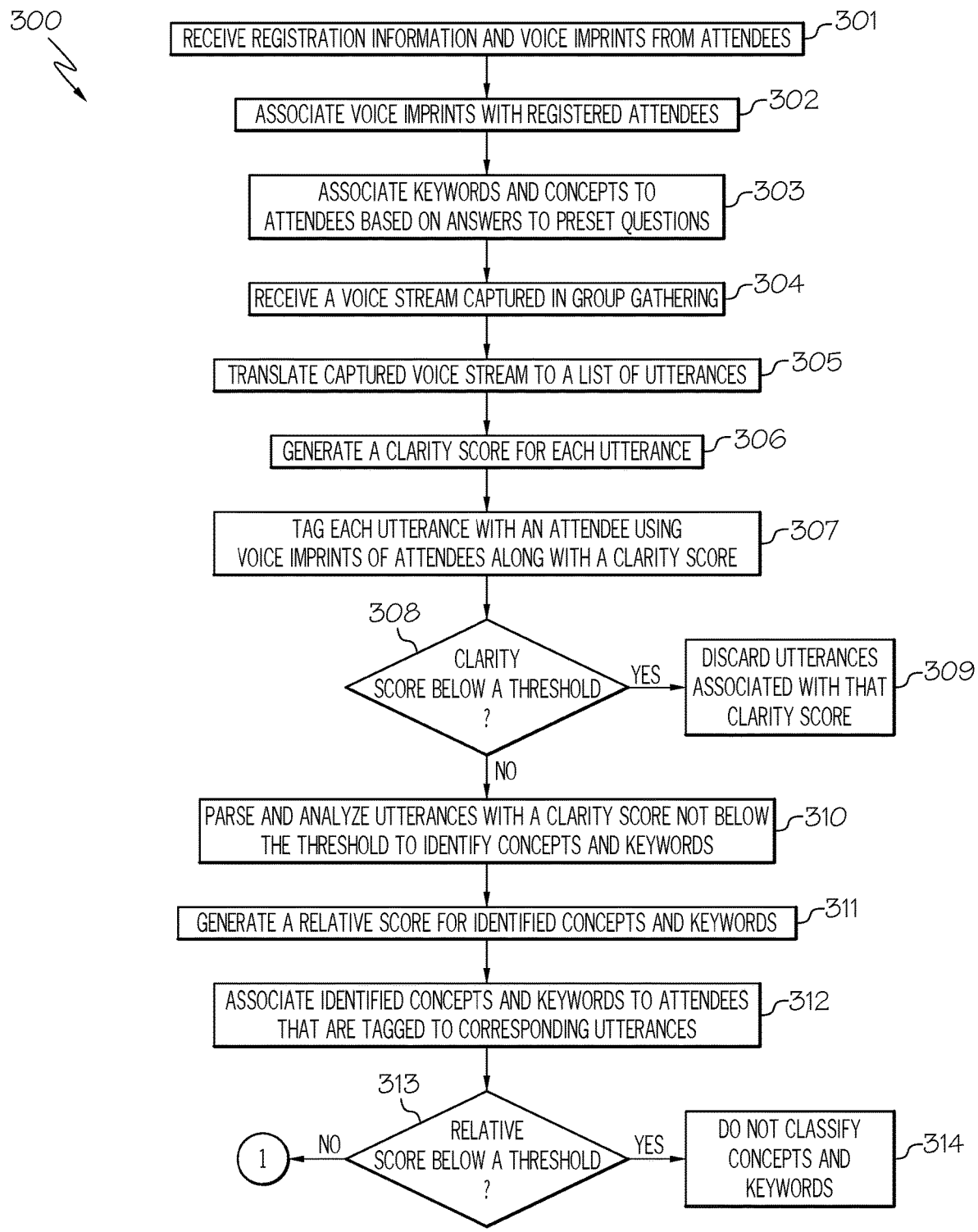
FIGS. 3A-3B are a flowchart of a method for discovering social network groups of interest to attendees of a group gathering in accordance with an embodiment of the present invention.
Figure 3B:
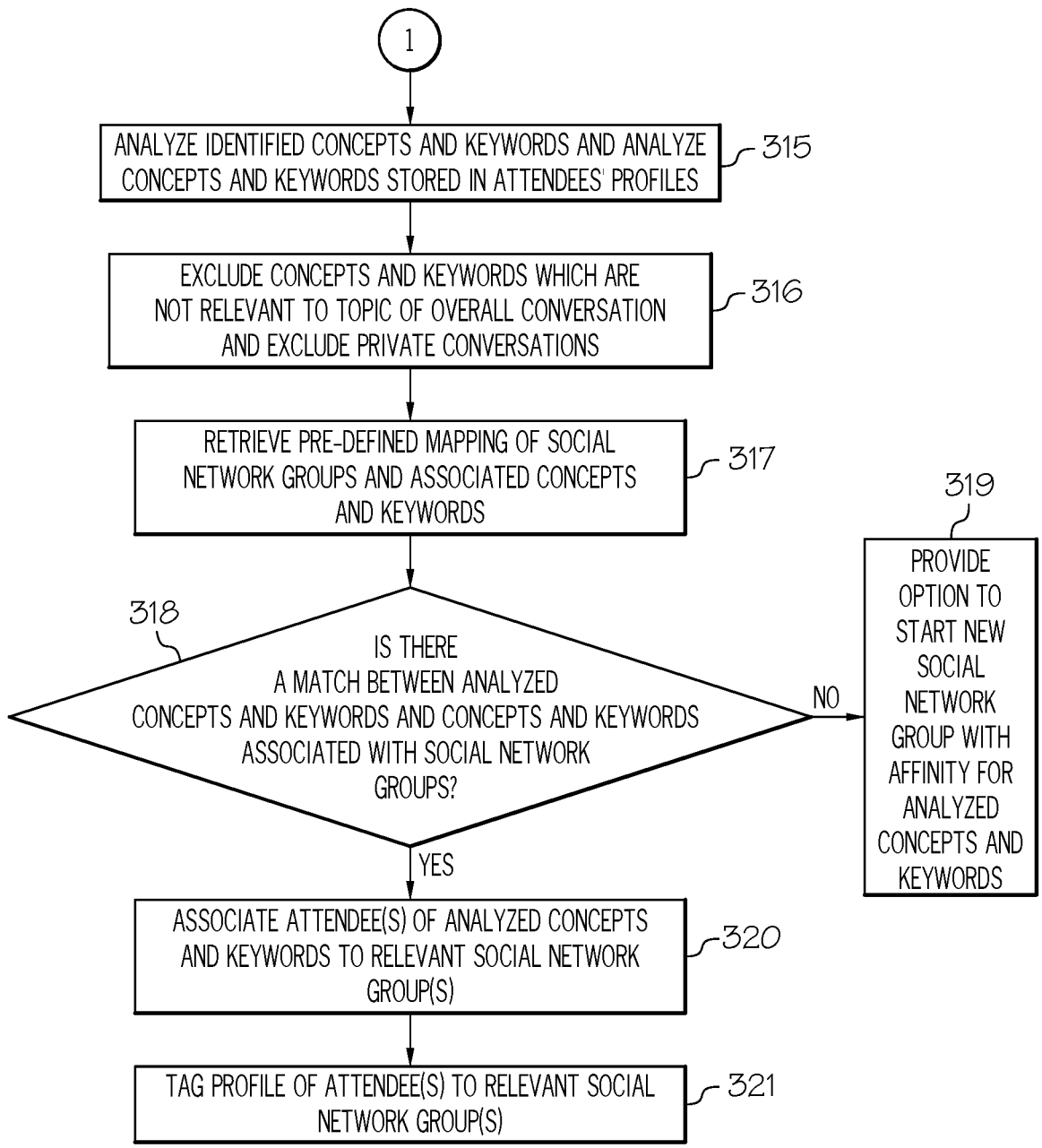

FIGS. 3A-3B are a flowchart of a method for discovering social network groups of interest to attendees of a group gathering in accordance with an embodiment of the present invention.

Referring to FIG. 3A, in conjunction with FIGS. 1-2, in step 301, registration system 101 receives registration information and voice imprints from attendees 102. In one embodiment, registration information provided by attendees 102 includes identification, such as a name and e-mail address. In one embodiment, voice imprints are received from attendees 102 by registration system 101 via a user's verbal introduction in response to a preset list of questions provided by registration system 101.

In step 302, registration system 101 associates the received voice imprints with the registered attendees.

In step 303, registration system 101 associates keywords and concepts to attendees 102 based on answers provided by attendees 102 to a preset list of questions provided by registration system 101. Keywords, as used herein, refer to a word or words that are used to describe the attendee's interests, opinions, ideas, etc. Concepts, as used herein, refer to the general notion of the attendee's interests, opinions, ideas, etc. In one embodiment, such keywords and concepts are stored in a profile of attendee 102. In one embodiment, such keywords and concepts are derived from the answers provided by attendee 102 using natural language processing, which is used to provide meaning to the answers provided by attendee 102.

In step 304, discovery system 105 receives a voice stream captured in the group gathering, such as a conference. As previously discussed, in one embodiment, listening devices 104 may be used to capture a voice stream in the group gathering, which may be received by discovery system 105.

In step 305, discovery system 105 translates the captured voice stream to a list of utterances (also referred to herein as the "transcript"). In one embodiment, discovery system 105 translates the captured voice stream to a list of utterances (also referred to herein as the "transcript"), such as by using speech recognition software. In one embodiment, such a translation process occurs at a predefined interval.

In step 306, discovery system 105 generates a score, referred to herein as the "clarity" score, for each utterance. A "clarity score," as used herein, refers to a value that indicates the level of clarity in the utterance. For example, the higher the value of the clarity score, the greater the clarity in the utterance. In one embodiment, the clarity score depends on factors, such as the relative recorded volume level of the utterance and whether multiples utterances are recorded concurrently in the captured voice stream (e.g., multiple conversations are being captured concurrently).

In step 307, discovery system 105 tags each utterance with the attendee 102 who made the utterance based on the voice imprints provided by attendees 102 during registration. Furthermore, in one embodiment, discovery system 105 further tags each utterance with the corresponding clarity score.

In step 308, a determination is made by discovery system 105 as to whether the clarity score is below a threshold (a particular value, which may user selected).

If the clarity score is below the threshold, then, in step 309, the utterances that are associated with that clarity score are discarded.

If, however, the clarity score is not below the threshold, then the utterances of the transcript with a clarity score not below the threshold are submitted to cognitive system 106 by discovery system 105. In step 310, cognitive system 106 uses natural language processing to parse and analyze the utterances with a clarity score not below the threshold to identify concepts and keywords.

In step 311, cognitive system 106 generates a score, referred to herein as the "relative score," used to assess the level of confidence that the identified concepts and keywords accurately describe the attendee's interests, opinions, ideas, etc. For example, the higher the score, the greater the confidence that the corresponding concept or keyword accurately describes the attendee's interest, opinion, idea, etc. In one embodiment, such a score is assessed based on how closely linked the concept or keyword is to the attendee's interest, opinion, idea, etc., which may have been learned during the registration process. For example, the keyword of "Detroit Tigers" may be used to describe the attendee's interest in the Detroit Tigers baseball team. Such a keyword would have a higher relative score than the keyword of "baseball" since the term "Detroit Tigers" is more closely linked to the attendee's interest in following the Detroit Tigers baseball team.

As previously discussed, in one embodiment, cognitive system 106 utilizes IBM Watson® Discovery Service to identify the concepts mentioned in the utterances. In such a tool, cognitive system 106 is able to infer that two different speakers are discussing the same concept (e.g., load balancer) even though different terms are being used (e.g., Ribbon Load Balancing client and F5 Local Traffic Manager).

In step 312, cognitive system 106 associates the identified concepts and keywords to attendees 102 that are tagged to the corresponding utterances. For example, if attendee 102A is tagged to utterance A, and concept A was identified from utterance A, then cognitive system 106 associated concept A to attendee 102A.

In step 313, a determination is made by cognitive system 106 as to whether the relative score is below a threshold (a particular value, which may user selected).

If the relative score is below the threshold, then, in step 314, the associated concepts and keywords are not classified.

Referring now to FIG. 3B, in conjunction with FIGS. 1-2, if, however, the relative score is not below the threshold, then, in step 315, aggregation and classification system 107 analyzes the identified concepts and keywords with a corresponding relative score that is not below the threshold, such as determining whether these concepts and keywords are relevant to the topic of the overall conversation or are part of a private conversation as discussed below. Furthermore, in one embodiment, the analyzed concepts and keywords further include the concepts and keywords that are stored in the attendees' profile.

After such concepts and keywords are analyzed, those concepts and keywords which are not relevant to the topic of the overall conversation or are part of a private conversation are excluded (excluded from being matched to the concepts and keywords of social network groups as discussed below in connection with step 318) by aggregation and classification system 107 in step 316. As previously discussed, in one embodiment, aggregation and classification system 107 analyzes the transcript to determine the topic of the overall conversation or whether a private conversation was recorded. In one embodiment, aggregation and classification system 107 utilizes natural language processing in analyzing the transcript described above. For example, aggregation and classification system 107 may determine that the topic of the conversation is directed to baseball after identifying keywords, such as "bat," "home run," and "strike-out." Aggregation and classification system 107 may then determine how relevant the analyzed concepts and keywords are to the topic of the overall conversation (e.g., baseball) based on how similar in meaning the analyzed concepts and keywords are to the topic of the overall conversation using natural language processing. In another example, aggregation and classification system 107 may determine that the conversation is to be private based on identifying certain keywords or conversational tone of the conversation using natural language processing.

In step 317, aggregation and classification system 107 retrieves a pre-defined mapping of social network groups and associated concepts and keywords.

In step 318, a determination is made by aggregation and classification system 107 as to whether there is a match between the analyzed concepts and keywords (excluding those concepts and keywords that were excluded in step 316) and the concepts and keywords associated with these social network groups. In one embodiment, such a determination is made based on the similarity between the analyzed concepts and keywords and the concepts and keywords associated with these social network groups.

If the similarity between the analyzed concepts and keywords and the concepts and keywords associated with these social network groups does not exceed a threshold (i.e., there is not a match), then, in step 319, aggregation and classification system 107 provides an option (such as to an attendee 102) to start a new social network group with an affinity for these analyzed concepts and keywords. In this manner, new concepts/keywords that are not associated with any preexisting social network group may be used to generate new social network groups to be associated with these new concepts/keywords. If aggregation and classification system 107 receives permission to start such a new social network group, aggregation and classification system 107 then creates such a new social network group. Aggregation and classification system 107 may then send invitations to the appropriate attendees 102 to join the social network group. For example, attendees 102 with profiles containing concepts and keywords that are similar to the concepts and keywords associated with the social network group may be asked to join the social network group. In another example, attendees 102 whose voice communications include concepts and keywords that are similar to the concepts and keywords associated with the social network group may be asked to join the social network group. In one embodiment, the new social network group is tagged with a reference to the applicable section of the transcript directed to the concept and/or keyword of the new social network group.

If, however, the similarity between the analyzed concepts and keywords and the concepts and keywords associated with these social network groups meets or exceeds the threshold (i.e., there is a match), then, in step 320, aggregation and classification system 107 associates those attendee(s) of the analyzed concepts and keywords to the relevant social network group(s). As discussed above, aggregation and classification system 107 may then send invitations to the appropriate attendees 102 to join those social network groups. In one embodiment, these social networks are tagged with a reference to the applicable section of the transcript directed to the concept and/or keyword of the social network group. In one embodiment, the attendee(s) of the analyzed concepts and keywords are associated with the relevant social network group(s) based on the analyzed identified concepts and keywords and/or based on the analyzed concepts and keywords stored in the attendees' profiles having a similarity with the concepts and keywords associated with these social network groups that meets or exceeds the threshold.

In step 321, aggregation and classification system 107 tags the profile of these attendee(s) to the relevant social network group(s).

In one embodiment, aggregating and classification system 107 may further tag the profile of these attendee(s) with the concepts and keywords associated with these social network group(s) (if not already included in the profile).

In this manner, the technical problem of systems, such as conference systems, not having the ability to identify or create social network groups to join attendees of a conference who may share a common interest and be interested in collaborating amongst each other is addressed by the present invention. As discussed above, the present invention provides a technological solution to the technical problem where systems, such as conference systems, are now able to discover social network groups of interests to attendees of the group gathering (e.g., conference) based on voice conversations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for discovering social network groups of interests to attendees of a group gathering, the computer program product comprising a computer readable storage medium having program code embodied therewith, the program code comprising the programming instructions for:

receiving voice imprints from said attendees of said group gathering;

associating said received voice imprints with said attendees of said group gathering;

translating a voice stream captured in said group gathering to a list of utterances;

tagging each utterance in said list of utterances with an attendee of said group gathering using said voice imprints of said attendees of said group gathering;

parsing and analyzing utterances in said list of utterances to identify concepts and keywords;
associating one or more of said identified concepts and keywords to a first attendee that is tagged to corresponding utterances; and
associating said first attendee to a social network group in response to said social network group having concepts and keywords with a similarity to said one or more identified concepts and keywords that meets or exceeds a threshold.

2. The computer program product as recited in claim 1, wherein the program code further comprises the programming instructions for:
retrieving a pre-defined mapping of social network groups and associated concepts and keywords; and
associating said first attendee to said social network group of said social network groups in response to said social network group having a mapping to concepts and keywords that have said similarity to said one or more identified concepts and keywords that meets or exceeds said threshold.

3. The computer program product as recited in claim 2, wherein the program code further comprises the programming instructions for:
providing an option to start a new social network group with an affinity to said one or more identified concepts and keywords in response to not identifying a social network group of said social network groups with a mapping to concepts and keywords that have said similarity to said one or more identified concepts and keywords that meets or exceeds said threshold.

4. The computer program product as recited in claim 3, wherein said social network group associated with said first attendee corresponds to said new social network group with said affinity to said one or more identified concepts and keywords.

5. The computer program product as recited in claim 1, wherein the program code further comprises the programming instructions for:
generating a score for each of said utterance in said list of utterances.

6. The computer program product as recited in claim 5, wherein the program code further comprises the programming instructions for:
tagging each utterance in said list of utterances with an attendee of said group gathering using said voice imprints of said attendees of said group gathering along with said score.

7. The computer program product as recited in claim 6, wherein the program code further comprises the programming instructions for:
parsing and analyzing utterances in said list of utterances with said score not being below a second threshold to identify concepts and keywords.

8. The computer program product as recited in claim 1, wherein the program code further comprises the programming instructions for:
creating a profile for said first attendee of said group gathering comprising concepts and keywords based on answers provided by said first attendee of said group gathering to a preset list of questions.

9. The computer program product as recited in claim 8, wherein the program code further comprises the programming instructions for:
associating said first attendee to said social network group in response to said social network group having concepts and keywords with a similarity to said one or more identified concepts and keywords or to one or more concepts and keywords in said profile of said first attendee that meets or exceeds said threshold.

10. The computer program product as recited in claim 1, wherein the program code further comprises the programming instructions for:
generating a score for said identified concepts and keywords.

11. A system, comprising:
a memory for storing a computer program for discovering social network groups of interests to attendees of a group gathering; and
a processor connected to said memory, wherein said processor is configured to execute the program instructions of the computer program comprising:
receiving voice imprints from said attendees of said group gathering;
associating said received voice imprints with said attendees of said group gathering;
translating a voice stream captured in said group gathering to a list of utterances;
tagging each utterance in said list of utterances with an attendee of said group gathering using said voice imprints of said attendees of said group gathering;
parsing and analyzing utterances in said list of utterances to identify concepts and keywords;
associating one or more of said identified concepts and keywords to a first attendee that is tagged to corresponding utterances; and
associating said first attendee to a social network group in response to said social network group having concepts and keywords with a similarity to said one or more identified concepts and keywords that meets or exceeds a threshold.

12. The system as recited in claim 11, wherein the program instructions of the computer program further comprise:
retrieving a pre-defined mapping of social network groups and associated concepts and keywords; and
associating said first attendee to said social network group of said social network groups in response to said social network group having a mapping to concepts and keywords that have said similarity to said one or more identified concepts and keywords that meets or exceeds said threshold.

13. The system as recited in claim 12, wherein the program instructions of the computer program further comprise:
providing an option to start a new social network group with an affinity to said one or more identified concepts and keywords in response to not identifying a social network group of said social network groups with a mapping to concepts and keywords that have said similarity to said one or more identified concepts and keywords that meets or exceeds said threshold.

14. The system as recited in claim 13, wherein said social network group associated with said first attendee corresponds to said new social network group with said affinity to said one or more identified concepts and keywords.

15. The system as recited in claim 11, wherein the program instructions of the computer program further comprise:
generating a score for each of said utterance in said list of utterances.

16. The system as recited in claim 15, wherein the program instructions of the computer program further comprise:

tagging each utterance in said list of utterances with an attendee of said group gathering using said voice imprints of said attendees of said group gathering along with said score.

17. The system as recited in claim 16, wherein the program instructions of the computer program further comprise:

parsing and analyzing utterances in said list of utterances with said score not being below a second threshold to identify concepts and keywords.

18. The system as recited in claim 11, wherein the program instructions of the computer program further comprise:

creating a profile for said first attendee of said group gathering comprising concepts and keywords based on answers provided by said first attendee of said group gathering to a preset list of questions.

19. The system as recited in claim 18, wherein the program instructions of the computer program further comprise:

associating said first attendee to said social network group in response to said social network group having concepts and keywords with a similarity to said one or more identified concepts and keywords or to one or more concepts and keywords in said profile of said first attendee that meets or exceeds said threshold.

20. The system as recited in claim 11, wherein the program instructions of the computer program further comprise:

generating a score for said identified concepts and keywords.

* * * * *